United States Patent
Metzgen et al.

(10) Patent No.: US 7,475,221 B1
(45) Date of Patent: Jan. 6, 2009

(54) CIRCULAR BUFFER ADDRESSING

(75) Inventors: Paul Metzgen, Chiswick (GB); Dominic Nancekievill, High Wycombe (GB); Tracy Miranda, Princess Gate (GB)

(73) Assignee: Altera Corporation, San Jose, CA (US)

( * ) Notice: Subject to any disclaimer, the term of this patent is extended or adjusted under 35 U.S.C. 154(b) by 343 days.

(21) Appl. No.: 10/893,655

(22) Filed: Jul. 16, 2004

Related U.S. Application Data

(60) Provisional application No. 60/534,663, filed on Jan. 6, 2004.

(51) Int. Cl.
G06F 12/00 (2006.01)
(52) U.S. Cl. .................. 711/219; 711/110; 711/220; 712/E9.043
(58) Field of Classification Search ......... 711/219–220, 711/110, 100; 712/E9.043; 708/100; 326/37, 326/52; 327/1
See application file for complete search history.

(56) References Cited

U.S. PATENT DOCUMENTS

| | | | |
|---|---|---|---|
| 4,800,524 A * | 1/1989 | Roesgen | 711/217 |
| 5,249,148 A * | 9/1993 | Catherwood et al. | 708/491 |
| 5,623,621 A * | 4/1997 | Garde | 711/220 |
| 5,649,146 A * | 7/1997 | Riou | 711/217 |
| 5,659,700 A * | 8/1997 | Chen et al. | 711/217 |
| 6,363,470 B1 * | 3/2002 | Laurenti et al. | 711/220 |
| 6,647,484 B1 * | 11/2003 | Jiang et al. | 711/220 |
| 2002/0194452 A1 * | 12/2002 | Catherwood | 711/220 |
| 2002/0199080 A1 * | 12/2002 | Haller et al. | 711/219 |
| 2003/0033499 A1 * | 2/2003 | Chou | 711/220 |

OTHER PUBLICATIONS

ADSP-2181 EZ-KIT Lite, Analog Devices, Programmer's Quick Reference, pp. 1-32.

* cited by examiner

*Primary Examiner*—Tuan V. Thai
*Assistant Examiner*—Michael C Krofcheck
(74) *Attorney, Agent, or Firm*—Weaver Austin Villeneuve & Sampson LLP

(57) ABSTRACT

Methods and apparatus are provided for performing circular buffer addressing. Upper boundaries, lower boundaries, circular buffer lengths, addresses, and offsets are set to allow circular buffer access efficiency. An addition/subtraction unit is provided to simplify implementation. Comparators are rearranged and in some instances replaced with combined adder/comparator logic units. The additional logic units and the rearrangement allow efficient implementation of circular buffer addressing, particularly on programmable chips.

29 Claims, 17 Drawing Sheets

CIRCULAR BUFFER ADDRESSING

CROSS REFERENCE TO RELATED APPLICATIONS

This application claims benefit of priority under 35 U.S.C. 119(e) of (i) U.S. Provisional Application No. 60/534,663 filed Jan. 6, 2004 and titled "CIRCULAR BUFFER ADDRESSING", the entirety of which is incorporated by reference for all purposes.

BACKGROUND OF THE INVENTION

1. Field of the Invention

The present invention relates to implementing circular buffer addressing mechanisms. In one example, the present invention relates to methods and apparatus for efficiently implementing circular buffer addressing that is particular efficient on programmable chip architectures.

2. Description of Related Art

Various hardware devices such as general purpose processors, cryptography accelerators, video accelerators, digital signal processing (DSP) processors, and microcontrollers can make use of circular buffer addressing. Circular buffer addressing allows rapid access to a variety of data sets. A circular buffer typically has an upper boundary and a lower boundary associated with an address range. A line in the circular buffer is accessed by reading or writing a particular address. The address can then be modified to access another line in the circular buffer.

In many examples, the address is modified by an offset that brings the address out of the address range of the circular buffer. A circular buffer addressing scheme can wrap the address to allow the out of range address to fall within the circular buffer address range. However, mechanisms for implementing circular buffers are limited. In many examples, separate comparators are used to check the upper and lower boundaries against a current address. The implementation can be inefficient in certain device implementations.

Consequently, it is desirable to provide improved techniques and mechanisms for performing circular buffer addressing.

SUMMARY OF THE INVENTION

Methods and apparatus are provided for performing circular buffer addressing. Upper boundaries, lower boundaries, circular buffer lengths, addresses, and offsets are set to allow circular buffer access efficiency. An addition/subtraction unit is provided to simplify implementation. Comparators are rearranged and in some instances replaced with combined adder/comparator logic units. The additional logic units and the rearrangement allow efficient implementation of circular buffer addressing, particularly on programmable chips.

In one embodiment, a method for accessing a buffer is provided. A circular buffer having an upper bound (U) and a lower bound (B) defining a circular buffer address range is provided. A current address (A) is modified using an offset (M) to yield a resulting address (R). If R falls outside of the circular buffer address range, R is wrapped to fall within the circular buffer address range by using carry information associated with the lower bits (AL) of A during the modification of A using M.

In another embodiment, a programmable chip is provided. The programmable chip includes a circular buffer having an upper bound (U), a lower bound (B), and a length (L) associated with the length of the region between U and B. Wrapping is used for the circular buffer so that an offset (M) added to a current address (A) yields a result (R) falling between U and B. The current address (A) has a series of lower bits (AL). R is calculated using L, A, and M and overflow information associated with AL during the addition of A and M.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

DETAILED DESCRIPTION OF SPECIFIC EMBODIMENTS

Figure 1B:
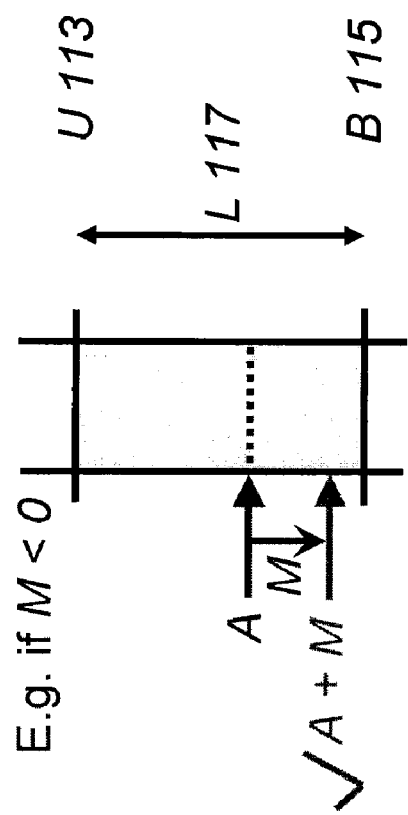
FIGS. 1A-1B are diagrammatic representations showing circular buffer addressing.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. For example, the techniques of the present invention will be described in the context of particular processors and memory.

For example, the techniques of the present invention will be described in the context of particular processors and instructions. However, it should be noted that the techniques of the present invention can be applied to a variety of types of processors and instructions. In the following description, numerous specific details are set forth in order to provide a thorough understanding of the present invention. The present invention may be practiced without some or all of these specific details. In other instances, well known process operations have not been described in detail in order not to unnecessarily obscure the present invention. Furthermore, techniques and mechanisms of the present invention will sometimes be described in singular form for clarity. However, it should be noted that some embodiments can include multiple iterations of a technique or multiple instantiations of a mechanism unless noted otherwise. For example, a processor is used in a variety of contexts. However, it will be appreciated that multiple processors can also be used while remaining within the scope of the present invention.

Circular buffer addressing is used by a variety of applications to allow rapid data access. A buffer having a particular size is provided with an upper bound and a lower bound, or an upper boundary address and a lower boundary address. Each address line can be used to access data in the buffer. A data access is performed by reading or writing the particular address line. To access another line in the buffer, the address can be modified by adding or subtracting an address offset. For example, an offset of 0x10 may be added as an offset during periodic clock cycles. Address lines increasing in 0x10 increments are then accessed until the upper bound is reached.

Using circular buffer addressing, the next data access is wrapped around to the lower end of the buffer. That is, in a simplified case, if a buffer has address lines 0x00, 0x10, 0x20, 0x30, and 0x40 and the address offset is 0x20, the address line 0x10 may be read after 0x40 is read. Circular buffer addressing in particularly prevalent in digital signal processing (DSP) applications. A wide variety of rules can be applied to particular circular buffer addressing schemes.

In order to implement a circular buffer addressing scheme, the address and the modified address are typically compared with the upper and lower bounds of a buffer. In one example, a current address is modified using an offset. The modified address is then compared to determine if the modified address falls within the range between the upper and lower bounds. If the address falls outside the range, the address is wrapped so that the modified address falls within the upper and lower bounds.

Implementing a circular buffer addressing scheme in hardware typically entails the use of adders, comparators, and multiplexers. An address and an offset are added to yield a modified address. The modified address is compared against a lower bound and against an upper bound. If the address falls outside of the range, the length of the range between the upper bound and the lower bound is used to further change the modified address to allow it to fall within the buffer. Multiplexers are then used to select the appropriate output. Implementing a circular buffer addressing scheme can be relatively trivial on conventional hardware devices. However, comparators and multiplexers are relatively expensive to implement on a programmable chip. Consequently, techniques and mechanisms are provided to allow more efficient implementation of circular buffer addressing using reduced resources. The improved implementation can not only be used for programmable devices, but can be implemented on any hardware device using circular buffer addressing.

According to various embodiments, circuitry associated with a circular buffer addressing unit is modified and additional logic blocks are introduced to increase the efficiency of a circular buffer addressing scheme. An addition/subtraction (add/sub) unit is added and comparators are rearranged. Rearrangement of the comparators led to yet another improved where conventional comparators are replaced using adder/comparator units. By using add/sub and adder/comparator units and rearranging the design, the efficient of a circular buffer addressing scheme is significantly increased.

Figure 1A:
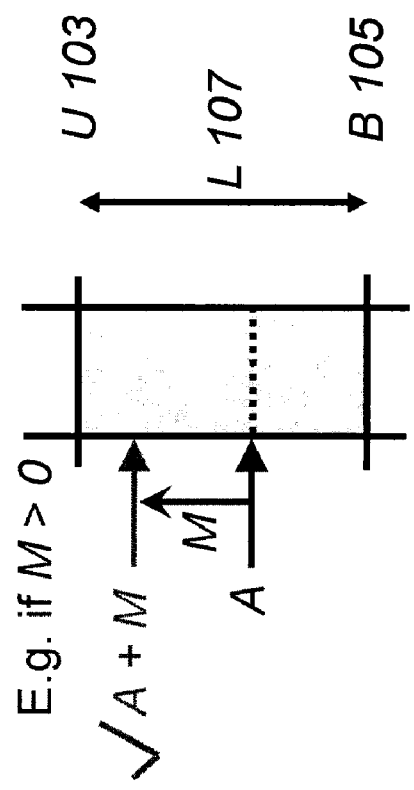

FIGS. 1A and 1B are diagrammatic representations showing one example of wrapping associated with a conventional circular buffer addressing scheme. As noted above, circular buffer addressing is a mode of addressing commonly used in hardware devices and particularly digital signal processing (DSP) processors to facilitate fast buffering of real-time data or fast access to tables of coefficients, e.g. finite impulse response (FIR) filter data. Circular buffer addressing is frequently provided in a DSP processor, and is useful for hardware implementations of DSP-like algorithms.

In typical implementations, several techniques and mechanisms are used to perform circular buffer addressing. In FIG. 1A, a value such as an unsigned integer A, is stored (usually in a register). The value A is also referred to herein as a current address. Two unsigned integer boundaries including an upper bound, U 103, and a lower bound, B 105, are also specified. The length of the buffer L 107 is also specified. Different implementations specify the boundaries and lengths in different ways. Different implementations place different limitations on what boundaries are permissible. Here, a positive value M is added to A and the sum A+M falls within the boundaries U 103 and B 105.

FIG. 1B shows a negative value added to a value A. Here the boundaries are upper bound U 113 and lower bound B 115. The specified length is L 117. Adding a negative offset M to A yields a value that falls within the boundaries U 113 and B 115.

Figure 2:
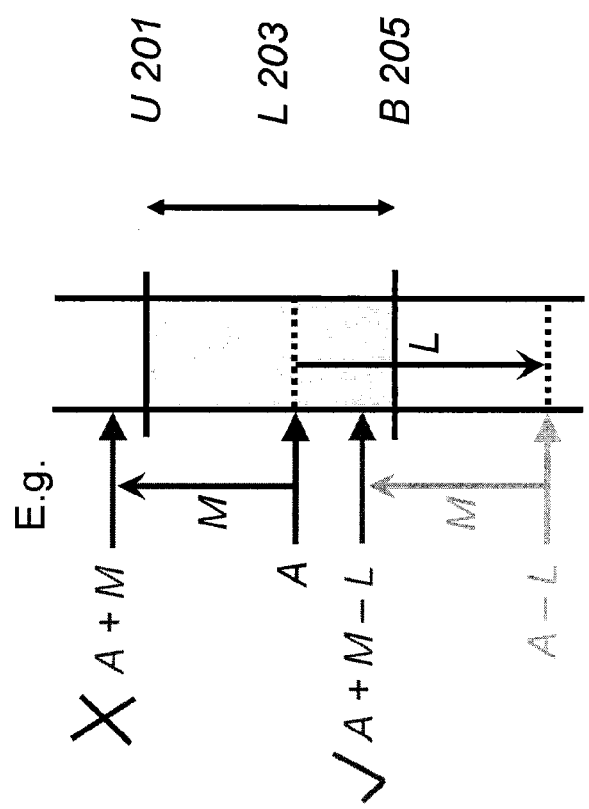
FIG. 2 is a diagrammatic representation showing wrapping associated with a circular buffer.
Figure 3:
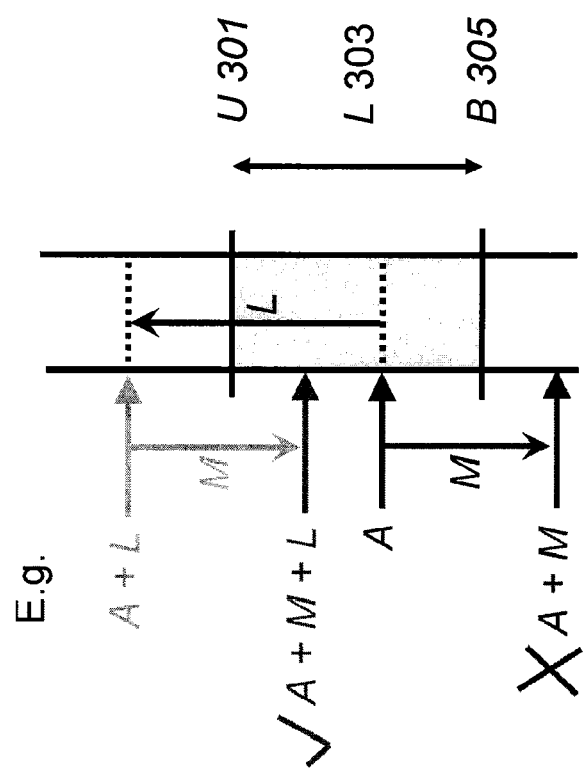
FIG. 3 is a diagrammatic representation showing wrapping associated with a circular buffer.

It is possible to add an offset such as a signed integer value, M, to A, such that adding M causes A to move outside the bounds. In such a situation, A is "wrapped" so that it remains within bounds. FIGS. 2 and 3 show examples of wrapping. FIG. 2 shows wrapping where a buffer of length L 203 has boundaries U 201 and B 205. FIG. 3 shows wrapping where a buffer of length L 303 has boundaries U 301 and B 305 Different implementations place different limitations on what values of M are permissible. Many implementations require A to start within bounds:

Let L be the length of the region between the boundaries $L=U-B$

This implementation specifies that M be an offset of less than L in either direction $-L<M<L$ This implementation specifies that A is within bounds before any offsets are applied $B \leq A < U$ If these requirements are met, wrapping may be defined by the following algorithm:
if $B \leq A+M < U$ then $A:=A+M$
else if $A+M \geq U$ then $A:=A+M-L$
else if $A+M < B$ then $A:=A+M+L$ According to various embodiments, the modified value represents a current address used to access the buffer. In typical implementations, the modified value is compared to both the lower and the upper bound.

Figure 4:
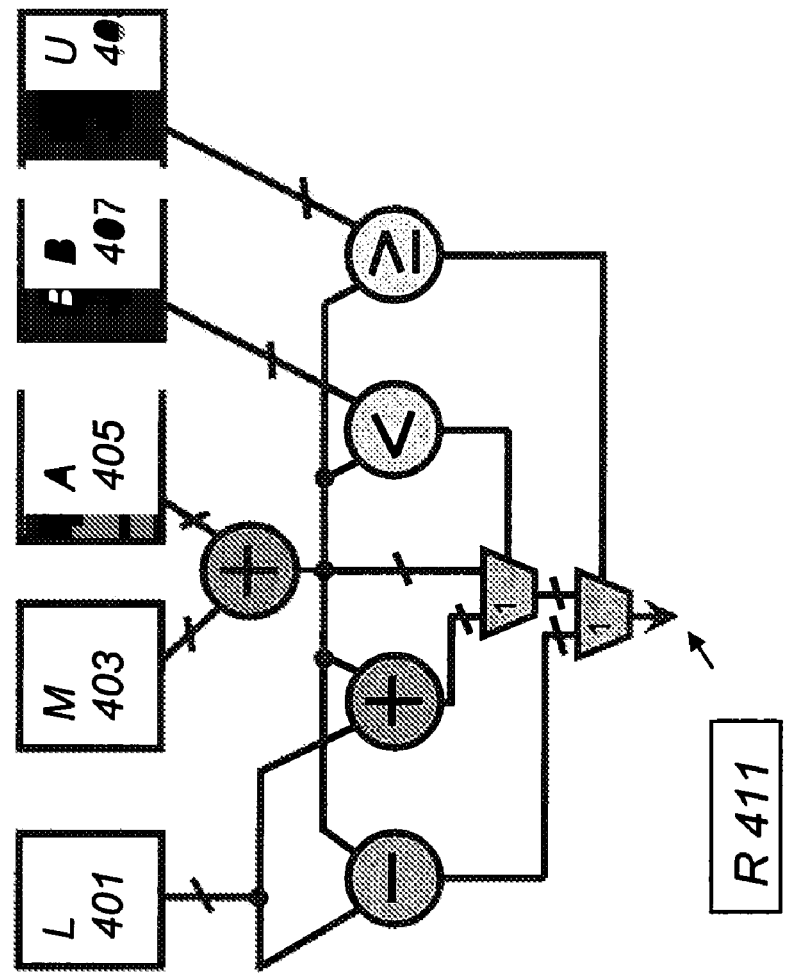
FIG. 4 is a diagrammatic representation address encoding.
Figure 5:
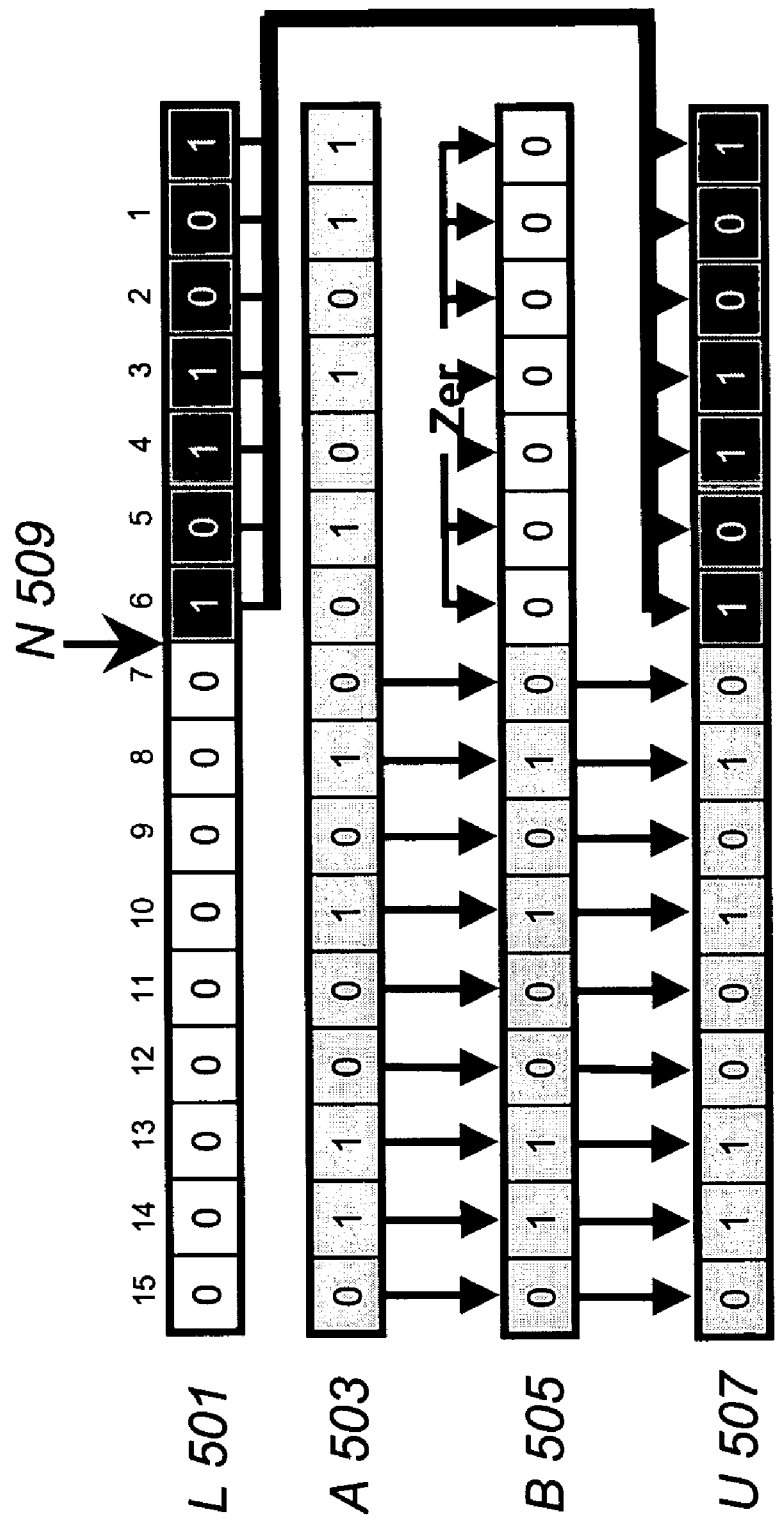
FIG. 5 is a diagrammatic representation showing circular buffer addressing logic.

FIG. 4 is a diagrammatic representation showing one typical implementation for performing circular buffer addressing. The logic is provided with a buffer length L 401, an offset M 403, a current address A 405, a buffer lower bound B 407, and a buffer upper bound U 409. M 403 is added to A 405. If the modified address is neither less than the lower bound B 407 or greater than the upper bound U 409, this modified value is selected by the multiplexers and provided as the result R 411. If A 405+M 403 is greater than or equal to U 409, then L 401 is subtracted from the sum A 405+M 403 and provided as the result R 411. If A 405+M 403 is less than B 407, then L 401 is added to the sum A 405+M 403 and provided as the result R 411.

According to various embodiments, the techniques of the present invention recognize that circular buffer addressing logic can be implemented in a more efficient manner by placing some restrictions on certain values used implement the circular buffer. In some examples, limitations are placed on allowed values of the upper bound of the lower bound such that the boundary values are entirely dependent on the length of the buffer and a current address.

FIG. 4 is a table representation showing one example of limitations placed on the upper bound and lower bound. According to various embodiments, N 509 is defined as the smallest integer such that $2^N \geq L$. Limitations are placed on the acceptable values of U 507 and B 505 such that they are entirely dependent on L 501 and A 503. Low bits in this example are bits 0 through 6. High bits in this example are bits 7 through 15. N in this example is set to 7, or the boundary between the low bits and the high bits. According to various embodiments, U, B, and L are specified to share the same high bits. Consequently, the following rules can be applied:

$B=A$ with the low N bits forced to zero $U=B+L=A$ with the low N bits forced to the value of L According to various embodiments, the techniques and mechanisms of the present invention recognize improvements to a conventional circular buffer addressing mechanism. In some examples, the techniques and mechanisms of the present invention make use of an addition/subtraction (ADDSUB) unit, rearrange comparators, and introduce a new functional unit to increase the efficiency of circular buffer addressing.

Figure 6:
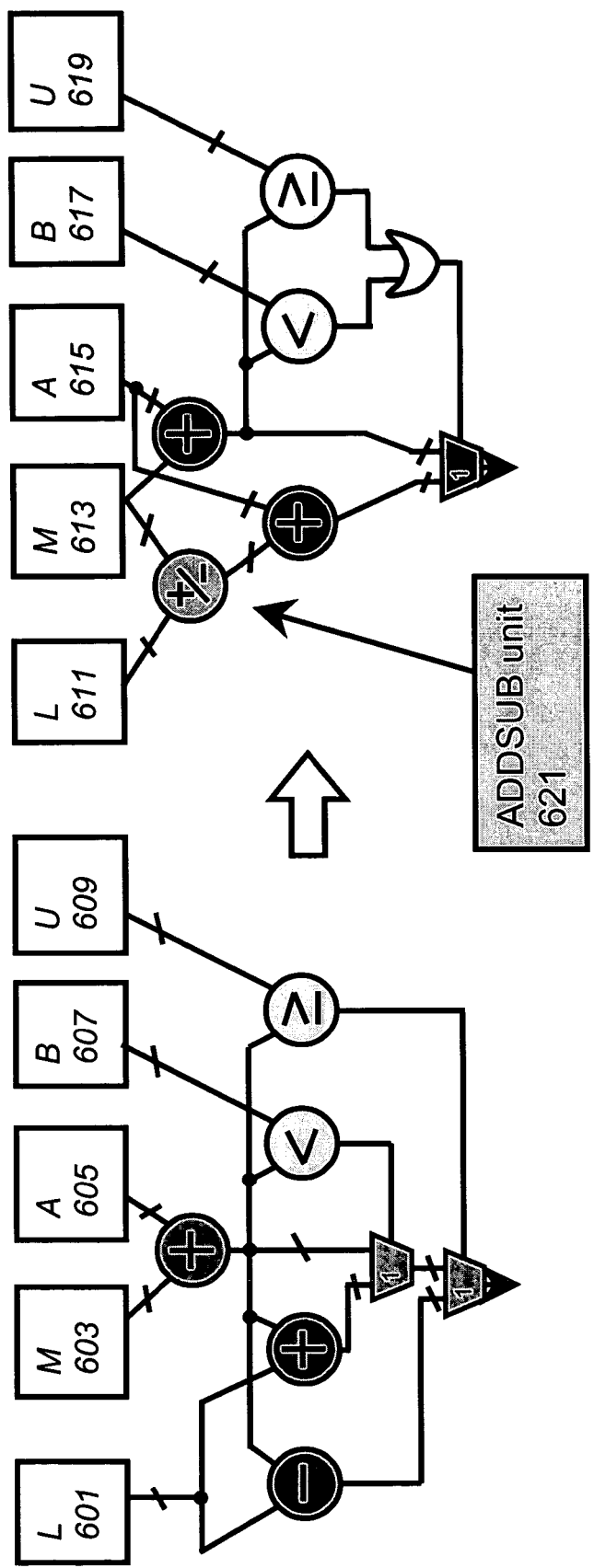
FIG. 6 is a diagrammatic representation showing circular buffer addressing logic having an addition/subtraction unit.

FIG. 6 is a diagrammatic representation showing the use of an addition/subtraction unit in one example to reduce circular buffer addressing logic. The ADDSUB unit calculates M+L if M<0 and M−L if M≧0. ADDSUB works because A+M−L is only required if M>0 and A+M+L is only required if M<0. Consequently, logic taking L 611, M 613, A 615, B 617, and U 619 provides A+M through a multiplexer if the sum does not exceed upper or lower bounds and provides A+M−L if M is greater than 0 and A+M+L if M is less than 0.

Figure 7:
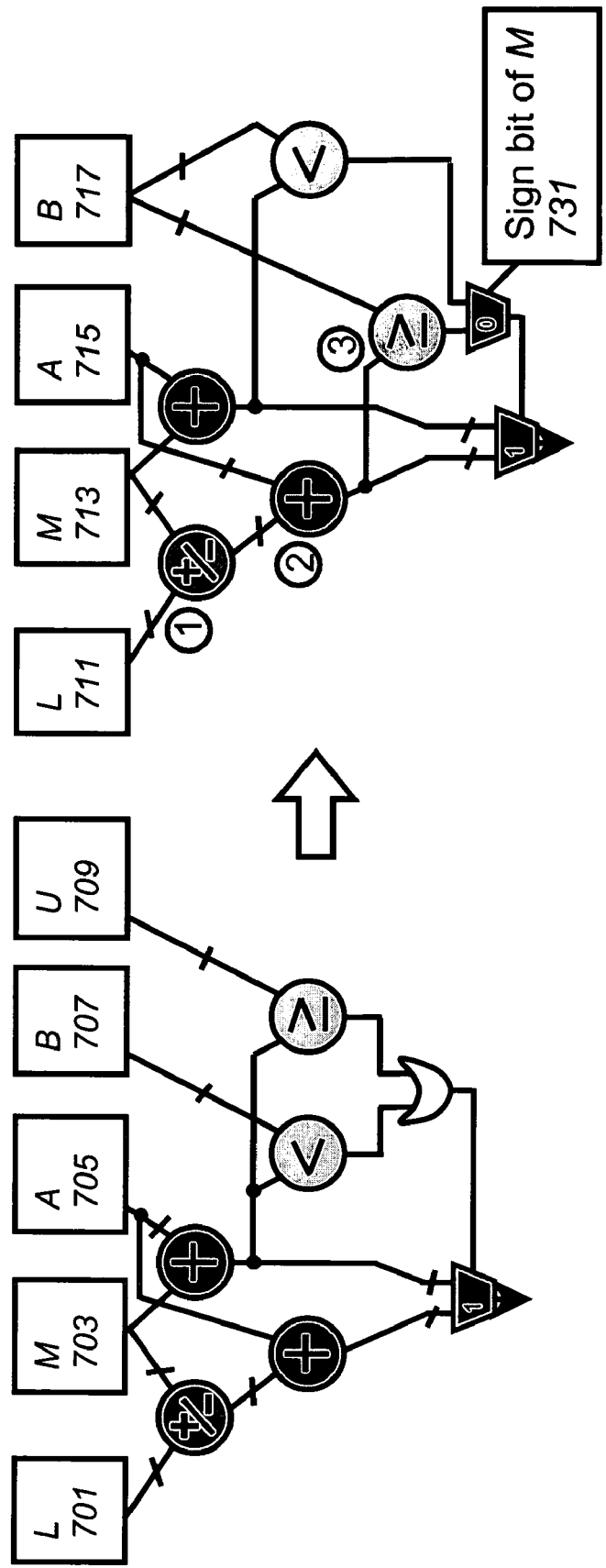
FIG. 7 is a diagrammatic representation showing rearrangement of comparators.

FIG. 7 is a diagrammatic representation showing one example where comparators are rearranged. Because the low N bits of B 717 are 0, and the rest of the bits are the same as A 715, comparisons with B 717 are straightforward. Rearranging comparators works because if M 713 is less than 0, then A 715+M 713 cannot be greater than or equal to U, because A 715 was less than U to start with. So if M 713 is less than 0, there is no need to compare A 715+M 713 with U.

If M 713 is greater than or equal to 0 then A 715+M 713 cannot be less than B 717 by the same reasoning, but A 715+M 713 could be greater than or equal to U. However, it is possible to show that A+M≧U is exactly equivalent to A+M−L≧B:

$A+M \geq U$ $A+M \geq B+L$ ($U=B+L$)

$A+M-L \geq B$

Rearranging comparators can be done in the following manner as depicted in FIG. 7:

A+M is compared with B when M is negative

If M is positive:
then the ADDSUB unit will calculate M−L
adding A to the result of this is A+M−L
this value is compared with B The circular buffer addressing logic makes use of two adders and two comparators. The techniques of the present invention recognize that the two adders and two comparators can be combined into merely two functional units. The two functional units can operate as adder/comparators. A combined adder/comparator unit can be constructed in a variety of manners. According to various embodiments, it is possible to design a single small unit which can calculate the sum A+X and also at the same time compare the result of the sum with B, subject to the provision that the results of the comparison are only valid if −L≦x<0. According to various embodiments, an adder/comparator unit works in the following manner:

Start with an ordinary adder unit
While performing the sum S=A+X, Determine whether S≧B
Let the low N binary bits of a number X be XL and the remaining high bits be XH
The low N bits of B, BL, are all zeroes (see definition of B earlier)
It is therefore the case that SL≧BL
Therefore S≧B exactly when SH≧BH $SH=AH+XH+V$ Where V is either 1 if there was arithmetic overflow from the calculation of AL+XL, or 0 otherwise
The comparison can entirely depend on V.
The adder/comparator works because of the following:

$SH=AH+XH+V$

If −L≦x<0, then X is shown in FIG. 7 and XH=−1.
The formula can be rewritten as:

$SH=AH-1+V$

But AH=BH (see definition of B earlier) so this may be rewritten again as:

$SH=BH-1+V$ $SH=BH-1+V$

If V=0 then SH=BH−1, so SH<BH
If V=1 then SH=BH, which means that SH≧BH
SH≧BH exactly when V=1, i.e. exactly when there is overflow from the calculation of AL+XL As stated earlier S≧B exactly when SH≧BH, so an adder that performs the sum A+X and also checks for overflow from the low N bits meets the specification of the Adder/Comparator unit stated earlier.

Figure 8:
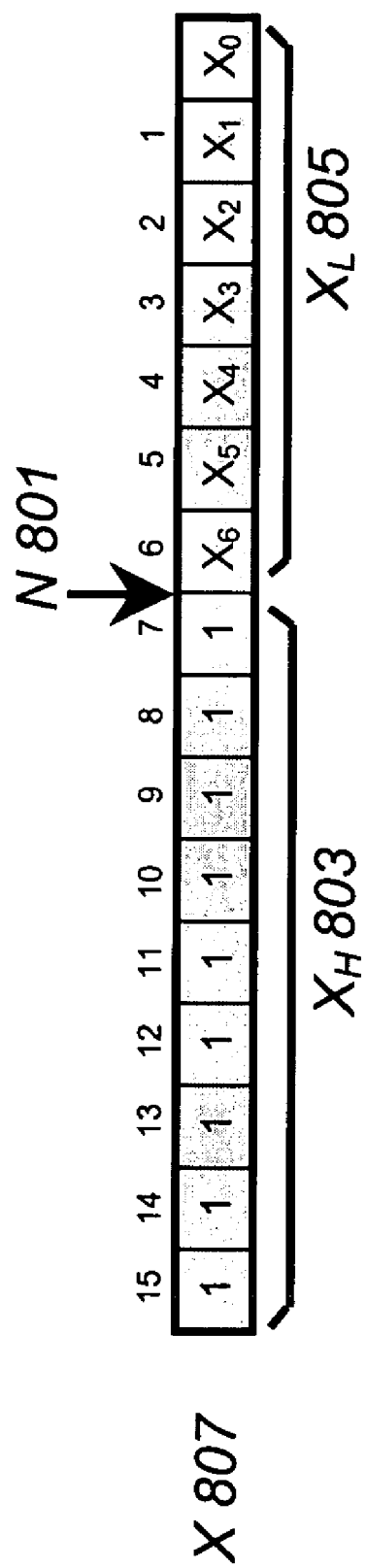
FIG. 8 is a diagrammatic representation showing high and low bits associated with a bit sequence.

Many programmable chip architectures provide ways to build efficient adders. Usually this is done by providing a fast way to link a group of logic elements into a chain. Each logic element has at least three inputs: one bit from each of the numbers to add, and the carry from the previous element in the chain. Each logic element calculates the sum and the carry. The sum is the ordinary output of the logic element and could be connected to anything. The carry is passed to the carry input of the next cell in the chain. Some architectures allow each of the two functions to be any possible function of the inputs. Others may restrict the sum and carry functions to be chosen from a specific subset of the possible functions. FIG. 8 shows a bit sequence 807. The bit sequence 807 includes high bits 803 and low bits 805 and a boundary N 801 between high bits 803 and low bits 805.

Figure 9:
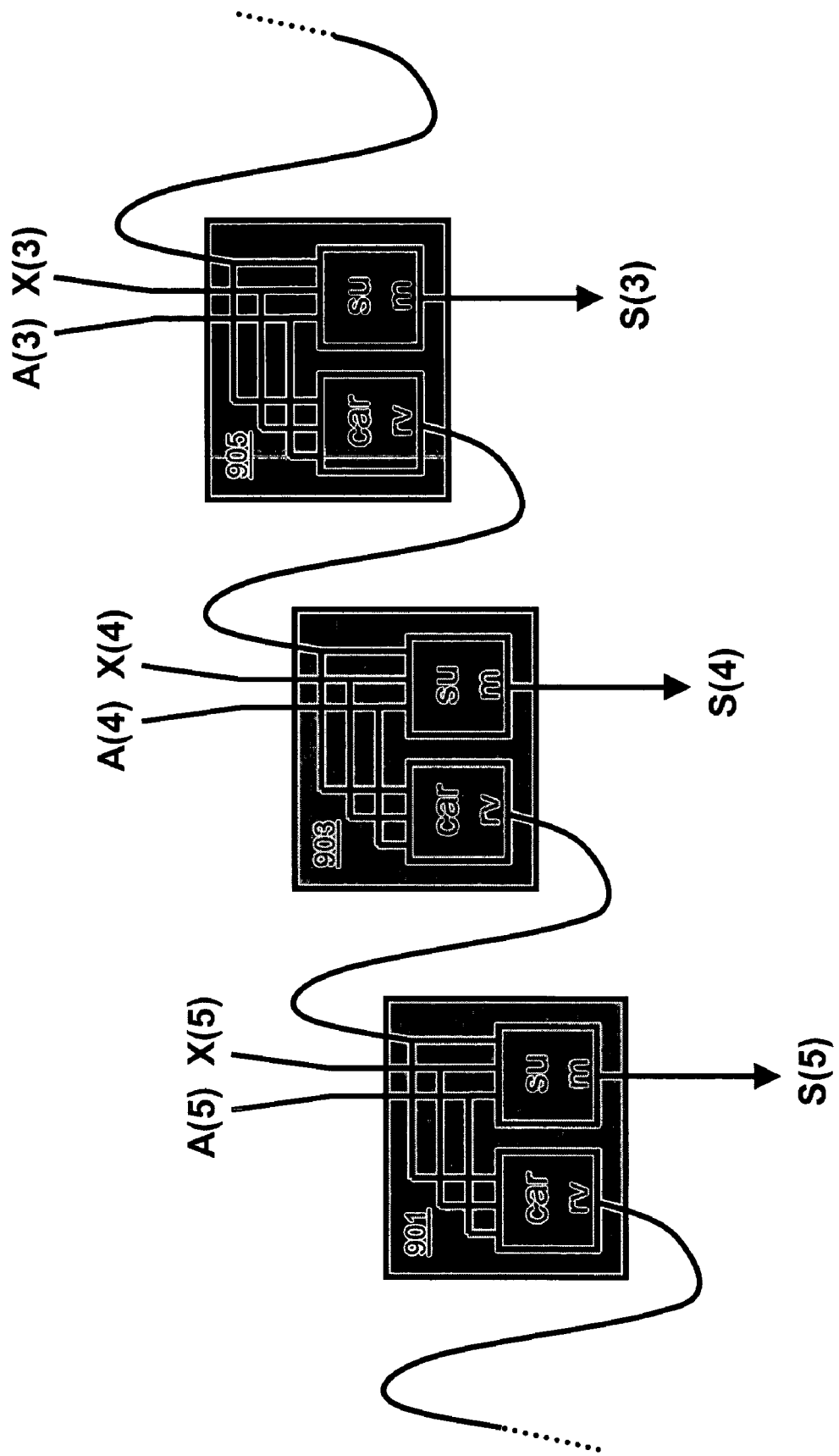
FIG. 9 is a diagrammatic representation showing an adder chain.

FIG. 9 is a diagrammatic representation showing a typical carry chain arrangement calculating A+X=S. In an ordinary adding element, the sum function is the XOR of all three inputs and the carry function is the majority AND of all three inputs. An ordinary adder is a chain of ordinary adding elements 901, 903, and 905. It is possible to insert extra elements into the chain. Each extra element passes its carry input on unchanged to its output so that it does not disturb the ordinary adder. According to various embodiments, this leaves the sum function part of the extra element free. It can calculate a function of the carry being passed through and up to two other inputs connected to that element.

Figure 10:
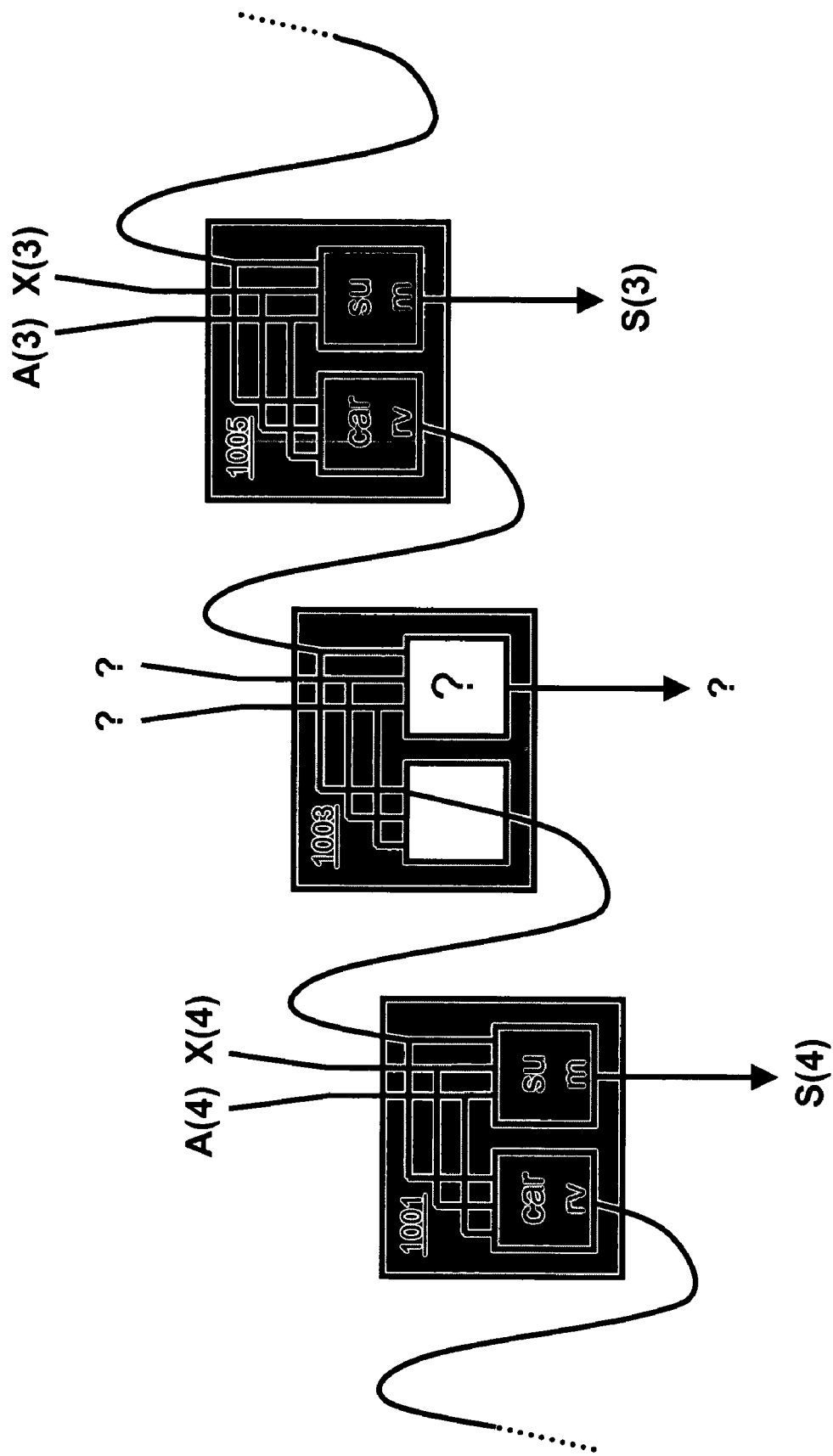
FIG. 10 is a diagrammatic representation showing the calculation associated with a carry-bit.
Figure 11:
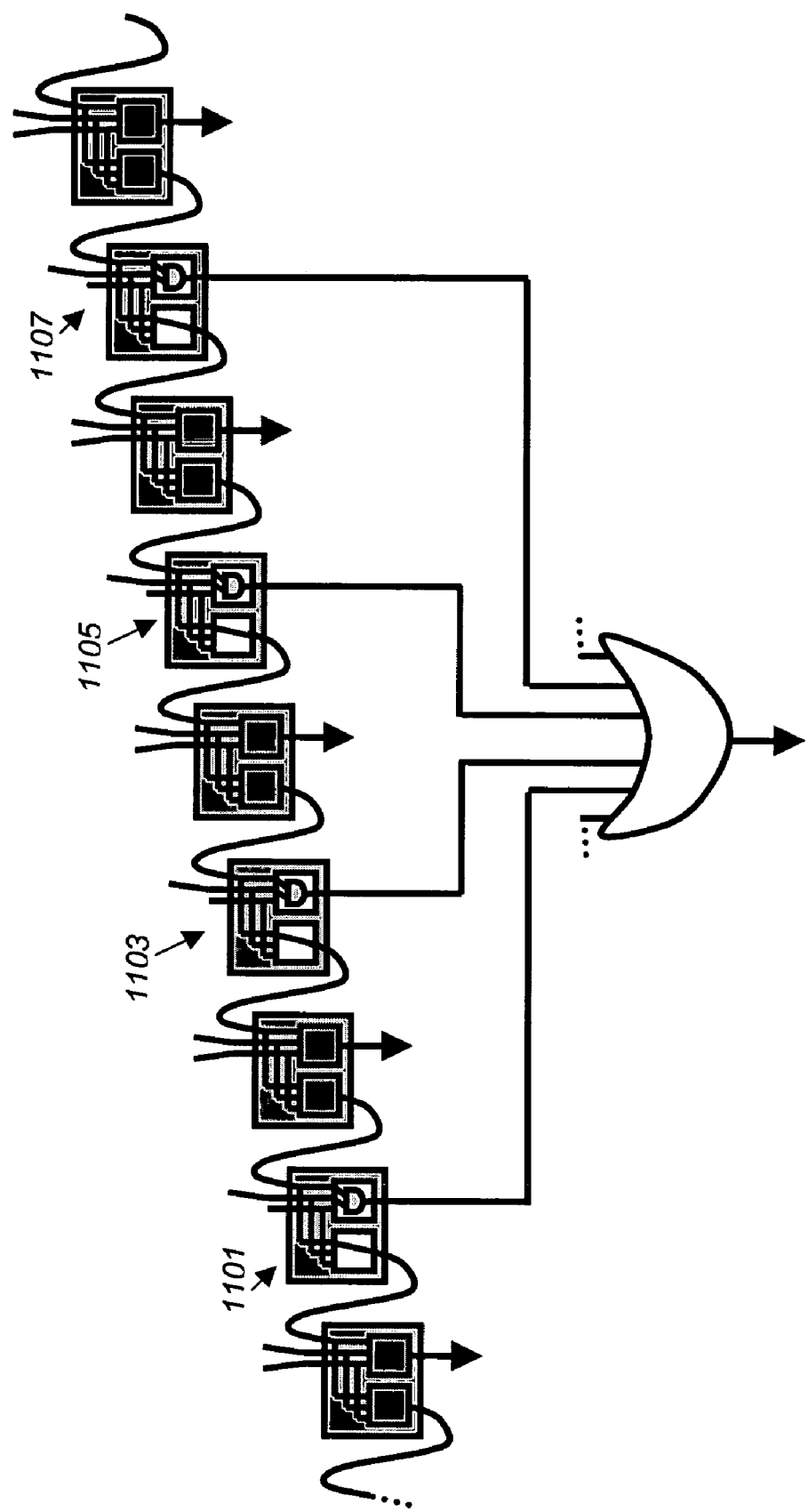
FIG. 11 is a diagrammatic representation showing the calculation associated with a carry-bit in an adder chain.

FIG. 10 is a diagrammatic representation showing an extra cell 1003 inserted into a carry chain with elements 1001 and 1005. The logical OR of all these ANDed carry signals will be 1 if the carry out of the Nth bit was 1, and 0 otherwise as shown in FIG. 11. FIG. 11 is a diagrammatic representation showing extra cells 1101, 1103, 1105, and 1107 inserted into a carry chain. According to various embodiments, the output of the extra cells 1101, 1103, 1105, and 1107 is then passed to gate logic to provide a carry output. Any logic or mechanism used to check for overflow from the addition of low N bits is referred to herein as an adder/comparator cell element.

Figure 12:
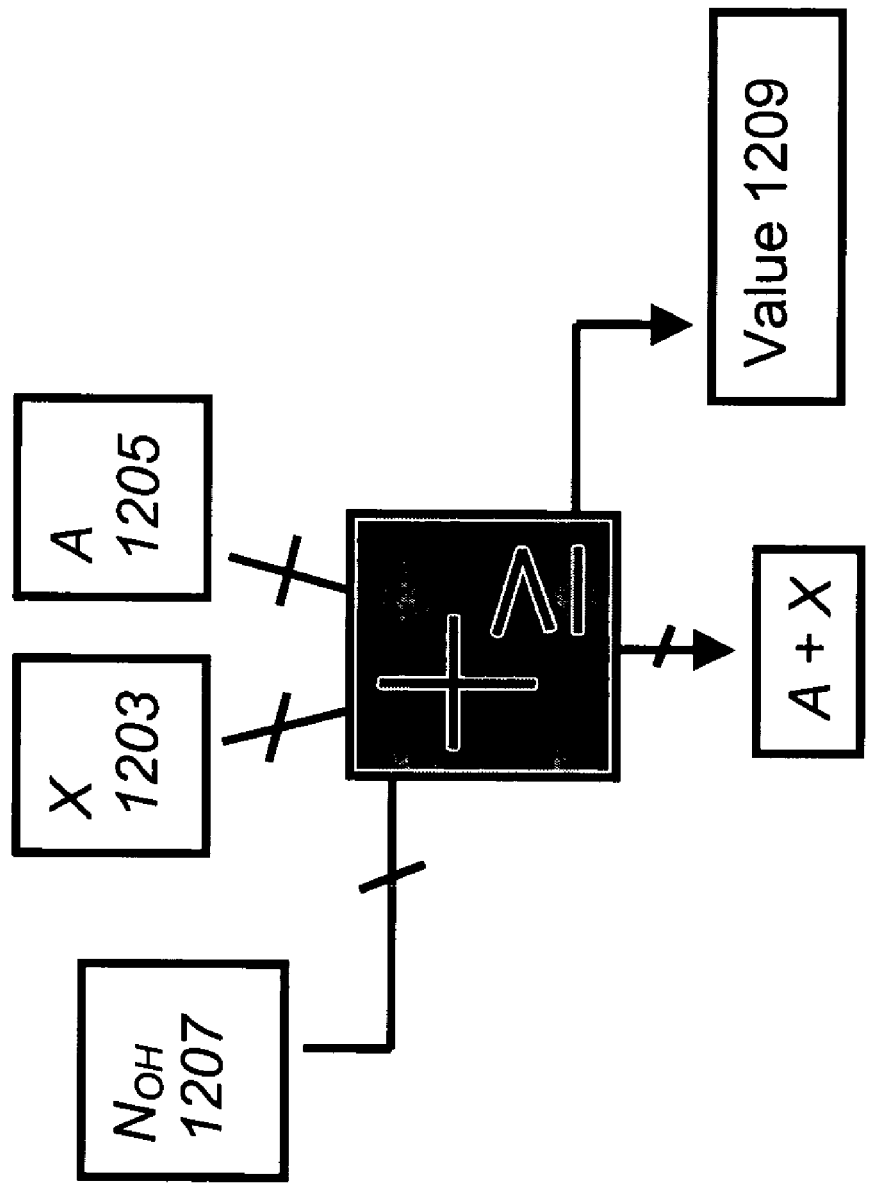
FIG. 12 is a diagrammatic representation showing an adder/comparator.

FIG. 12 is a diagrammatic representation showing one example of an adder/comparator. According to various embodiments, the adder/comparator cakes three inputs and provides two outputs. In one example, the adder/comparator takes two values, a current address A 1205 and an offset X 1203 and provides the sum of the two values. However, the adder/comparator also checks to determine if the sum of the two values is less than B. According to various embodiments, it can merely compare the sum to B. However, the adder/comparator can also use the NOH value 1207 to determine if the sum is less than B. As noted above, the adder/comparator can use the NOH value to determine if the sum of the low bits yields a carry-bit. In one example, the NOH value provides information to determine how many low bits are used in the operands. According to various embodiments, if a carry bit is needed, then the result is out of bounds. Otherwise, the result is within bounds.

Figure 13:
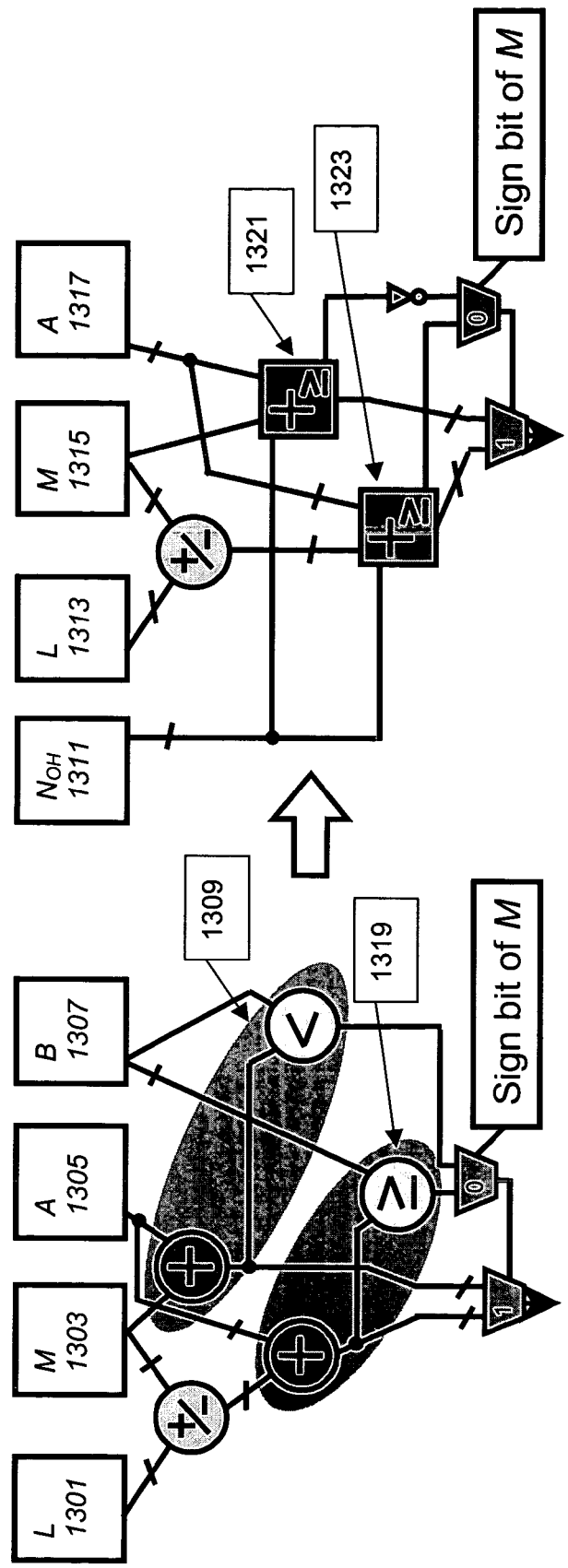
FIG. 13 is a diagrammatic representation showing use of adder/comparator units.

FIG. 13 is a diagrammatic representation showing the combination of adders and comparators using one example of an adder/comparator as depicted in FIG. 12. A typical design takes L 1301, M 1303, A 1305, and B 1307 as inputs. Each adder and comparator pair 1309 and 1319 in typical design are used to handle the input processing. Each adder and comparator pairs 1309 and 1319 may be replaced with an instance of the adder/comparator unit 1321 and 1323. In one example, a design taking NOH 1311, L 1313, M 1315, and A 1317 replaces adder and comparator pairs 1309 and 1319 with adder/comparator units 1321 and 1323. The "<" comparator is simply a "$\geqq$" comparator with an inverter on its output.

The techniques and mechanisms of the present invention can also reduce the size of a circular buffer addressing mechanism. According to various embodiments, N is "the smallest integer such that $2^N \geqq L$." If N is further constrained to be, for example, the smallest integer such that $2^N \geqq L$ and N divides by two, then many logic elements are saved. An extra logic element need only be inserted into the adder after every bit which could be the Nth bit. If N is constrained to fewer possibilities, then fewer logic elements need be inserted. Reduced size can be obtained by limiting the range of natural numbers within bounds.

The size in logic elements of the design depends on the size of the numbers in use and, according to various embodiments, also the number of possible values of N. In one example, let W be the width of A in bits and let P be the number of possible values of N. The cost of typical implementations is around 11W logic elements where 4W are used to store the numbers L, A, B, U, 7W are used for the adders, comparators and bus multiplexers that make up the design. According to various embodiments of the present invention, the cost of this invention is only around 6W+4P. If P=W the invention requires 10W logic elements in total and is more efficient than conventional implementations. In many cases it will be possible to reduce P to 0.5W or 0.25W leading to the invention being much smaller than the prior art Although the techniques and mechanisms of the present invention are applicable to a variety of different devices including general purpose processors, video accelerators, cryptography accelerators, digital signal processors, microcontrollers, etc., the techniques and mechanisms of the present invention are particularly applicable to programmable chips. Implementing circular buffer addressing logic is typically expensive on a programmable chip.

Figure 14:
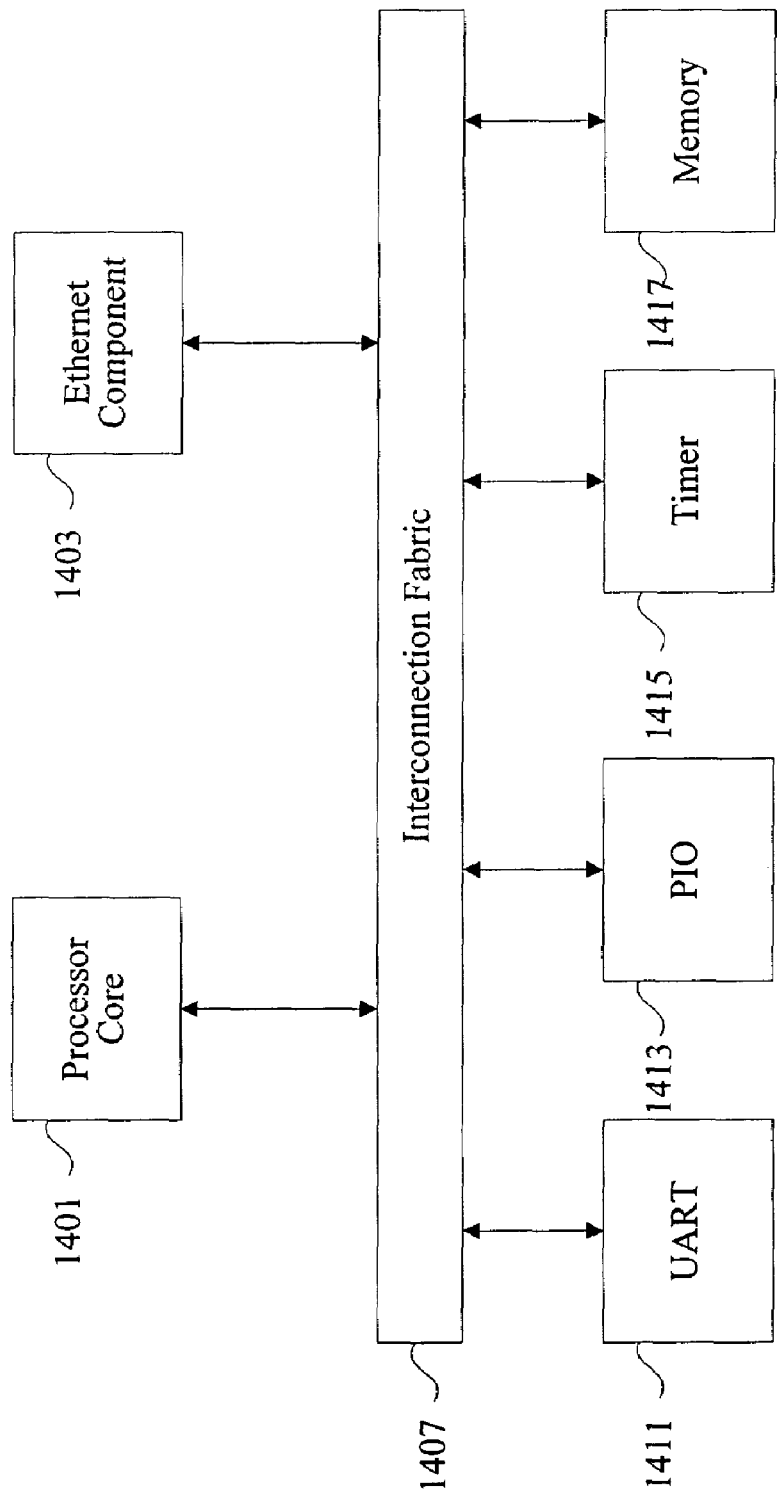
FIG. 14 is a diagrammatic representation showing a programmable chip system.

FIG. 14 is a diagrammatic representation showing one example of a system on a programmable chip that can be used to implement the techniques of the present invention. The system includes a processor core, a hardware accelerator, peripheral devices, and peripheral interfaces. Peripheral devices and peripheral interfaces are herein referred to as components. The system on a programmable chip includes processor core 1401 and an Ethernet component 1403 as well as peripheral components UART 1411, PIO 1413, timer 1415, and data memory 1417. In some examples, the Ethernet component 103 is instead a Digital Signal Processing (DSP) core, a cryptography accelerator, or a video processor. It should be noted that the system can include both on-chip memory 1417 and off-chip memory. In one example, the data memory 1417 can support variable latency or fixed latency access. The components are interconnected using an interconnection fabric 1407. Any mechanism or logic for connecting components in a system is referred to herein as an interconnection fabric. In one example, the interconnection fabric is a bus. In another example, the interconnection fabric is a secondary side arbitration fabric.

The programmable chip uses different types of resources that can be interchangeably used in different allocations to implement the system on a programmable chip. In one example, the programmable chip uses logic elements for implementing each of the various components on the programmable chip.

Logic elements typically can be implemented using components such as antifuses, static RAM, and EPROMS. Any mechanism on a programmable chip that performs an operation on a given number of input lines to provide one or more outputs based on information programmed is herein referred to as a logic element. Some logic elements are implemented as combinations of lookup tables and switches for performing Boolean operations on input lines. In one example, a logic element includes a 16-bit SRAM lookup table (LUT) that can implement an arbitrary 4-input logic function, circuitry that forms a fast carry chain and a fast cascade chain, a register and preset/reset logic for the register. In other examples, a logic element is an adaptive logic module (ALM) that provides 8 inputs, allowing it to efficiently support various configurations such as 6-input or 7-input lookup tables or two independent 4-input lookup tables.

The techniques and mechanisms of the present invention allow the implementation of a system on a programmable chip from a high-level language program. In one example, variable latency and fixed latency can be supported on a system using a conventional bus architecture.

A system bus typically has a set width (e.g. 64 bits, 128 bits) and allows only one primary component to actively use the bus at any one time. In conventional systems, only one primary component can access any one of the given secondary components at any given time. Multiple primary components accessing secondary components in a manner that would cause data bit collisions if performed on the same data lines is referred to herein as accessing secondary components at the same time.

In one example, an Ethernet component is accessing a secondary PIO. While the Ethernet component is accessing the secondary PIO, a processor can not access an SDRAM through a peripheral interface even if both the primary streaming output device and the peripheral interface are available.

According to various embodiments of the present invention, it is recognized that a bus is no longer required in certain applications such as system on a chip, system on a programmable chip, and other computer system implementations. A device such as a programmable logic device (PLD) or a field programmable gate array (FPGA) using a hardware descriptor language (HDL) is herein referred to as a programmable chip or a programmable device. Instead of implementing complicated bus sharing schemes using mechanisms such as splitting, the bus itself can be eliminated to improve system performance.

According to specific embodiments, it is recognized that primary components and secondary components need not be routed through a construct such as a bus. By not routing signals through a bus, a streaming output device can be implemented in a much more efficient manner. The conventional data and address lines that make up the bus are no longer the resource in contention. Instead, secondary components are resources in contention, as the number of physical lines connected to each secondary component in a system can be fixed. Furthermore, by not using a bus, interconnection flexibility is enhanced. For example, an Ethernet component can be allocated a variety of ports for directly accessing a memory and the only resource in contention would be the memory.

Consequently, a system bus arbitrator associated with all the secondary components in a computer system is no longer needed. Instead, secondary components themselves that may be accessed by more than one primary component are assigned individual secondary side arbitrators. An arbitrator that corresponds to a specific secondary component accessible by more than one primary component is referred to herein as a secondary side arbitrator. In one embodiment, there is a secondary side arbitrator for each secondary component in a computer system. In other embodiments, there is a secondary side arbitrator for selected secondary components in a system. The techniques of the present invention recognize that Ethernet component support for high-level language programs can be more efficiently and effectively provided in a system by using secondary side arbitration.

Figure 15:
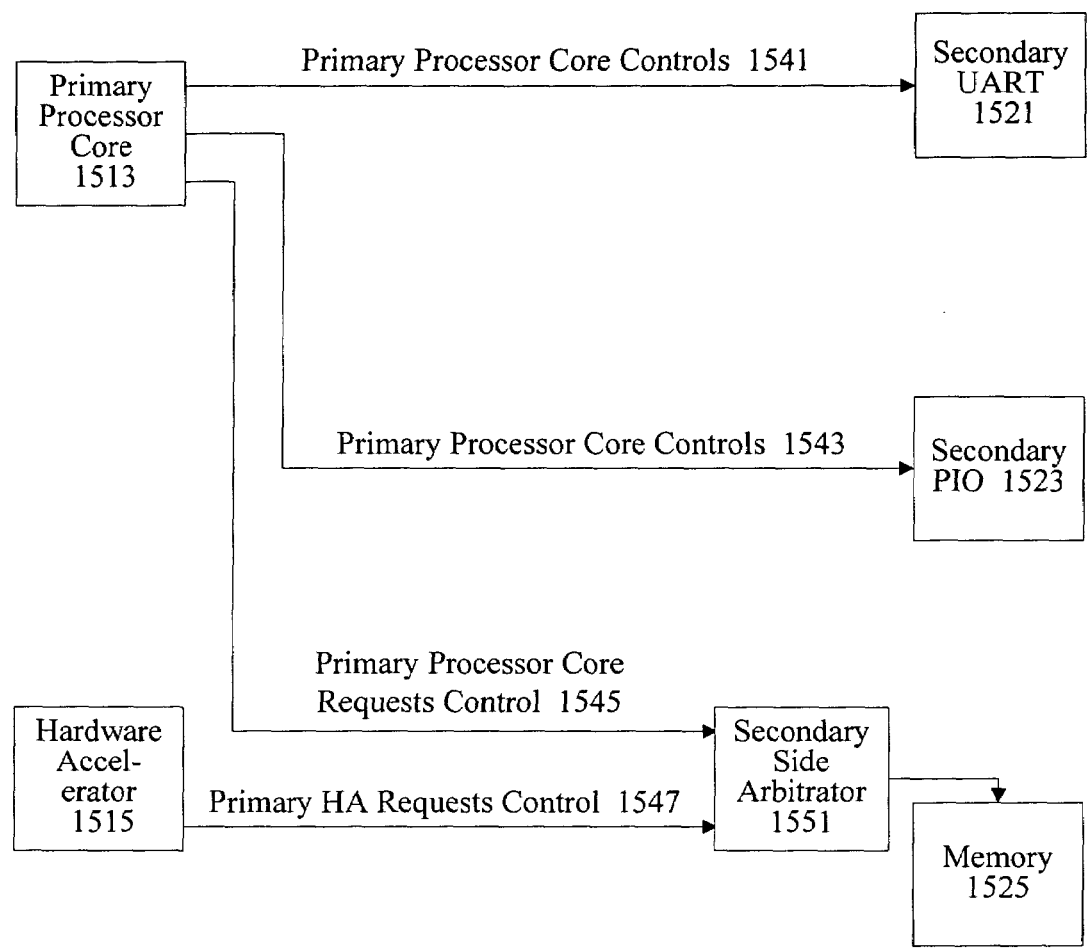
FIG. 15 is a diagrammatic representation showing an interconnection fabric.

FIG. 15 is a diagrammatic representation showing one example of a system using secondary side arbitration, sometimes referred to as slave side arbitration, simultaneous multiple primary components, or simultaneous multiple masters. A system using individual arbitrators that correspond to individual secondary components accessible by more than one primary component is referred to herein as a secondary side arbitration system. The secondary side arbitration system no longer requires a bus or a system bus arbitrator that prevents a second primary component from accessing a second secondary component when a first primary component is accessing a first secondary component. According to various embodiments, a secondary component such as peripheral interface 1525 is associated with a secondary side arbitrator 1551. However, secondary components UART 1521 and PIO 1523 are not associated with any arbitrator. In one example, secondary component UART 1521 and secondary PIO 1523 can only be accessed by primary CPU 1513 and not by primary Ethernet device 1515. A secondary memory component 1525, however, can be accessed by both primary CPU 1513 and primary Ethernet device 1515.

According to various embodiments, a secondary side arbitrator 1551 allows a first secondary component in a system to be accessed by a first primary component at the same time a second secondary component in the system is accessed by a second primary component. For example, peripheral interface 1525 can be accessed by primary Ethernet 1515 through secondary side arbitrator 1551 at the same time, secondary UART 1521 is accessed by primary CPU 1513.

By allowing a CPU to access a secondary component at the same time another primary component such as a streaming output device or an Ethernet component is accessing memory, bus bottlenecks can be reduced. By using the simultaneous multiple primary component architecture, more direct connections between components can also be supported.

Figure 16:
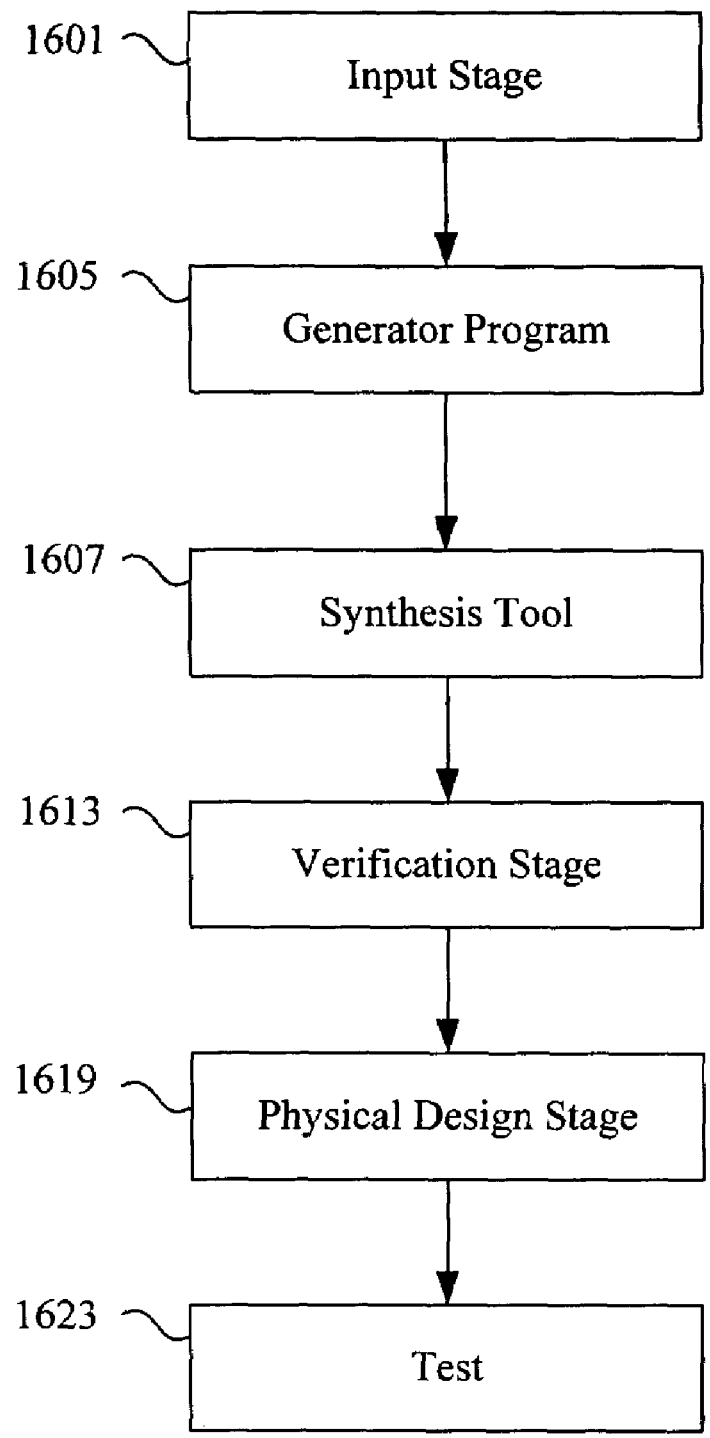
FIG. 16 is a diagrammatic representation showing a technique for implementing the programmable chip.

FIG. 16 is a diagrammatic representation showing implementation of a system on a programmable chip. An input stage 1601 receives selection information typically from a user for logic such as a processor core as well as other components such as a streaming output device to be implemented on an electronic device. In one example, the input received is in the form of a high-level language program. A generator program 1605 creates a logic description and provides the logic description along with other customized logic to any of a variety of synthesis tools, place and route programs, and logic configuration tools to allow a logic description to be implemented on an electronic device.

In one example, an input stage 1601 often allows selection and parameterization of components to be used on an electronic device. The input stage 1601 also allows configuration of variable or fixed latency support. In some examples, components provided to an input stage include intellectual property functions, megafunctions, and intellectual property cores. The input stage 1601 may be a graphical user interface using wizards for allowing efficient or convenient entry of information. The input stage may also be a text interface or a program reading a data file such as a spreadsheet, database table, or schematic to acquire selection information. The input stage 1601 produces an output containing information about the various modules selected.

In typical implementations, the generator program 1605 can identify the selections and generate a logic description with information for implementing the various modules. The generator program 1605 can be a Perl script creating HDL files such as Verilog, Abel, VHDL, and AHDL files from the module information entered by a user. In one example, the generator program identifies a portion of a high-level language program to accelerate. The other code is left for execution on a processor core. According to various embodiments, the generator program 1605 identifies pointers and provides ports for each pointer. One tool with generator program capabilities is System on a Programmable Chip (SOPC) Builder available from Altera Corporation of San Jose, Calif. The generator program 1605 also provides information to a synthesis tool 1607 to allow HDL files to be automatically synthesized. In some examples, a logic description is provided directly by a designer. Hookups between various components selected by a user are also interconnected by a generator program. Some of the available synthesis tools are Leonardo Spectrum, available from Mentor Graphics Corporation of Wilsonville, Oreg. and Synplify available from Synplicity Corporation of Sunnyvale, Calif. The HDL files may contain technology specific code readable only by a synthesis tool. The HDL files at this point may also be passed to a simulation tool 1609.

As will be appreciated by one of skill in the art, the input stage 1601, generator program 1605, and synthesis tool 1607 can be separate programs. The interface between the separate programs can be a database file, a log, or simply messages transmitted between the programs. For example, instead of writing a file to storage, the input stage 1601 can send messages directly to the generator program 1605 to allow the generator program to create a logic description. Similarly, the generator program can provide information directly to the synthesis tool instead of writing HDL files. Similarly, input stage 1601, generator program 1605, and synthesis tool 1607 can be integrated into a single program.

A user may select various modules and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 1607.

A synthesis tool 1607 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 1613 typically follows the synthesis stage 1607. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 1613, the synthesized netlist file can be provided to physical design tools 1619 including place and route and configuration tools. A place and route tool typically locates logic cells on specific logic elements of a target hardware device and connects wires between the inputs and outputs of the various logic elements in accordance with logic required to implement an electronic design. The device can also be physically tested at 1623.

For programmable logic devices, a programmable logic configuration stage can take the output of the place and route tool to program the logic device with the user selected and parameterized modules. According to various embodiments, the place and route tool and the logic configuration stage are provided in the Quartus Development Tool, available from Altera Corporation of San Jose, Calif. As will be appreciated by one of skill in the art, a variety of synthesis, place and route, and programmable logic configuration tools can be tested using various techniques of the present invention.

As noted above, different stages and programs can be integrated in a variety of manners. According to one embodiment, the input stage 1601, the generator program 1605, the synthesis tool 1607, the verification tools 1613, and physical design tools 1619 are integrated into a single program. The various stages are automatically run and transparent to a user. The program can receive the user selected modules, generate a logic description depicting logic for implementing the various selected modules, and implement the electronic device. As will be appreciated by one of skill in the art, HDL files and EDF files are mere examples of a logic description. Other file formats as well as internal program representations are other examples of a logic description.

Figure 17:
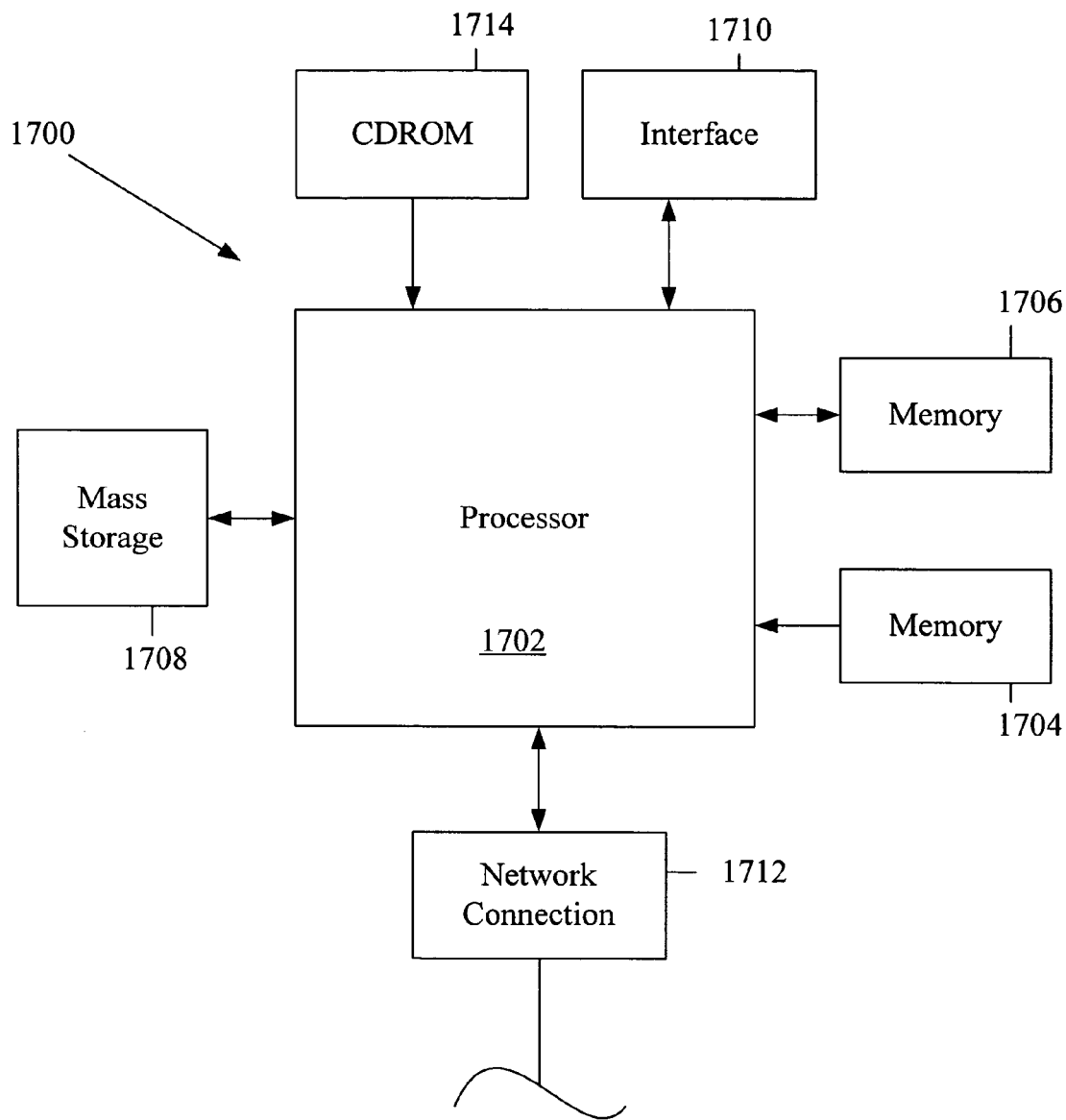
FIG. 17 is a diagrammatic representation depicting a computer system.

FIG. 17 illustrates a typical computer system that can be used to implement a programmable chip. The computer system 1700 includes any number of processors 1702 (also referred to as central processing units, or CPUs) that are coupled to devices including memory 1706 (typically a random access memory, or "RAM"), memory 1704 (typically a read only memory, or "ROM"). The processors 1702 can be configured to generate a test sequences for any designated processor. As is well known in the art, memory 1704 acts to transfer data and instructions uni-directionally to the CPU and memory 1706 is used typically to transfer data and instructions in a bi-directional manner.

Both of these memory devices may include any suitable type of the computer-readable media described above. A mass storage device 1708 is also coupled bi-directionally to CPU 1702 and provides additional data storage capacity and may include any of the computer-readable media described above. The mass storage device 1708 may be used to store programs, data and the like and is typically a secondary storage medium such as a hard disk that is slower than memory. The mass storage device 1708 can be used to hold a library or database of prepackaged logic or intellectual property functions, as well as information on generating particular configurations. It will be appreciated that the information retained within the mass storage device 1708, may, in appropriate cases, be incorporated in standard fashion as part of memory 1706 as virtual memory. A specific mass storage device such as a CD-ROM 1714 may also pass data uni-directionally to the CPU.

CPU 1702 is also coupled to an interface 1710 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1702 optionally may be coupled to a computer or telecommunications network using a network connection as shown generally at 1712. With such a network connection, it is contemplated that the CPU might receive information from the network, or might output information to the network in the course of performing the above-described method steps. It should be noted that the system 1700 may also be associated with devices for transferring completed designs onto a programmable chip. The above-described devices and materials will be familiar to those of skill in the computer hardware and software arts.

The hardware elements described above may be configured (usually temporarily) to act as multiple software modules for performing the operations of this invention. For example, instructions for running a generator program, input stage (e.g., a wizard), and/or compiler may be stored on mass storage device 1708 or 1714 and executed on CPU 1708 in conjunction with primary memory 1706.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of processors and instruction lengths and should not be restricted to the ones mentioned above. It is therefore intended that the invention be interpreted to include all variations and equivalents that fall within the true spirit and scope of the present invention.

What is claimed is:

1. A method for accessing a buffer, comprising:
    providing a circular buffer having an upper bound (U) and a lower bound (B) defining a circular buffer address range, wherein the circular buffer comprises a first adder/comparator having inputs lines configured to receive M, A, and a bit vector (NOH) and a second adder/comparator having input lines configured to receive an adder/subtractor output, A, and NOH;
    modifying a current address (A) using an offset (M) to yield a resulting address (R), wherein if R falls outside of the circular buffer address range, R is wrapped to fall within the circular buffer address range by using carry information associated with lower bits (AL) of A during the modification of A using M.

2. The method of claim 1, wherein a length (L) is associated with the length of the region between U and B.

3. The method of claim 2, wherein R is calculated using L, A, and M and carry information associated with AL.

4. The method of claim 3, wherein A further comprises a series of upper bits (AH).

5. The method of claim 3, wherein N is the number of lower bits (AL) where 2 raised to the Nth power is greater than or equal to L.

6. The method of claim 5, wherein U and B are restricted such that U and B are dependent on L and A.

7. The method of claim 5, wherein the circular buffer comprises an adder/comparator unit.

8. The method of claim 7, wherein the adder/comparator unit performs the sum A+M and also checks for carry information from the lower bits (AL) during the addition of A and M.

9. The method of claim 8, wherein the adder/comparator unit takes A and M as inputs and outputs the sum A+M and determines if A+M is greater than B.

10. The method of claim 9, wherein the adder/comparator determines if A+M is greater than B by determining carry information from the lower bits (AL) during the addition of A and M.

11. The method of claim 10, wherein carry information is determined during the addition of the N−1 bit.

12. The method of claim 10, wherein carry information is determined by using the bit vector (NOH).

13. A programmable chip, comprising:
    a circular buffer having an upper bound (U), a lower bound (B), and a length (L) associated with the length of the region between U and B, wherein wrapping is used for the circular buffer so that an offset (M) added to a current address (A) yields a result (R) falling between U and B, the current address (A) having a series of lower bits (AL), wherein R is calculated using L, A, and M and overflow information associated with AL during the addition of A and M, wherein the circular buffer comprises a first adder/comparator having inputs lines configured to receive M, A, and a bit vector (NOH) and a second adder/comparator having input lines configured to receive an adder/subtractor output, A, and NOH.

14. The programmable chip of claim 13, wherein A further comprises a series of upper bits (AH).

15. The programmable chip of claim 13, wherein N is the number of lower bits (AL) where 2 raised to the Nth power is greater than or equal to L.

16. The programmable chip of claim 15, wherein U and B are restricted such that U and B are dependent on L and A.

17. The programmable chip of claim 15, wherein the circular buffer comprises an adder/comparator unit.

18. The programmable chip of claim 17, wherein the adder/comparator unit performs the sum A+M and also checks for overflow from the lower bits (AL) during the addition of A and M.

19. The programmable chip of claim 18, wherein the adder/comparator unit takes A and M as inputs and outputs the sum A+M and determines if A+M is greater than B.

20. The programmable chip of claim 19, wherein the adder/comparator determines if A+M is greater than B by determining if there is overflow from the lower bits (AL) during the addition of A and M.

21. The programmable chip of claim 20, wherein overflow is checked during the addition of the N−1 bit.

22. The programmable chip of claim 20, wherein overflow is determined by using the bit vector (NOH).

23. The programmable chip of claim 15, wherein the values A and M are passed to an adder/comparator unit.

24. The programmable chip of claim 15, wherein the bit vector (NOH) is used to hold carry signal output information associated with M and a corresponding addition with A.

25. The programmable chip of claim 24, wherein the adder/subtractor is configured to output M+L if M<0 and M−L if M>=0.

26. The programmable chip of claim 13, wherein the circular buffer further comprises an adder/subtractor.

27. The programmable chip of claim 26, wherein the adder/subtractor is configured to output M+L if M<0 and M−L if M>=0.

28. A programmable device, comprising:
means for providing a circular buffer having and upper bound (U) and a lower bound (B) defining a circular buffer address range, wherein the circular buffer comprises a first adder/comparator having inputs lines configured to receive M, A, and a bit vector (NOH) and a second adder/comparator having input lines configured to receive an adder/subtractor output, A, and NOH;
means for modifying a current address (A) using an offset (M) to yield a resulting address (R), wherein if R falls outside of the circular buffer address range, R is wrapped to fall within the circular buffer address range by using carry information associated with lower bits (AL) of A during the modification of A using M.

29. The programmable device of claim 28, wherein a length (L) is associated with the length of the region between U and B.

* * * * *